United States Patent [19]
Kadle et al.

[11] Patent Number: 5,431,217
[45] Date of Patent: Jul. 11, 1995

[54] HEAT EXCHANGER EVAPORATOR

[75] Inventors: Prasad S. Kadle, East Amherst, N.Y.; Hans J. Gustafsson, Rechange, Luxembourg

[73] Assignee: General Motors Corporation, Detroit, Mich.

[21] Appl. No.: 217,915

[22] Filed: Mar. 25, 1994

[30] Foreign Application Priority Data

Nov. 9, 1993 [GB] United Kingdom ............... 3923115

[51] Int. Cl.$^6$ .............................................. F28D 1/03
[52] U.S. Cl. ................................. 165/153; 165/176
[58] Field of Search ................. 165/153, 174, 176

[56] References Cited

U.S. PATENT DOCUMENTS

| | | | |
|---|---|---|---|
| 3,976,128 | 8/1976 | Patel et al. | 165/153 |
| 5,024,269 | 6/1991 | Noguchi et al. | 165/153 |
| 5,178,209 | 1/1993 | Aoki et al. | 165/110 |

FOREIGN PATENT DOCUMENTS

| | | | |
|---|---|---|---|
| 61-55596 | 3/1986 | Japan | 165/153 |
| 61-161398 | 7/1986 | Japan | 165/176 |
| 3-191296 | 8/1991 | Japan | 165/153 |
| 4-371798 | 12/1992 | Japan | 165/176 |

*Primary Examiner*—Allen J. Flanigan
*Attorney, Agent, or Firm*—Patrick M. Griffin

[57] ABSTRACT

A multi-pass evaporator (10) of a heat exchanger for a motor vehicle air-conditioning system includes a plurality of heat exchanger tubes (12a–t) coupled to first and second header tubes (30,32) disposed side by side. The first header tube contains an inlet tube (48) extending from an inlet end (38) of the first header tube (30) to a position intermediate the length of the first header tube (30). The ratio of the axial cross-sectional area of the interior of the inlet tube (48) to the axial cross-sectional area of the space between the first header tube (30) and the inlet tube (48) is in the range of 1:4.0 to 1:7.0. The axial cross-sectional area of the interior of the inlet tube (48) is equal to or greater than 35 mm$^2$. This ratio of areas and size of inlet tube has been found to reduce considerably noise produced during use of the evaporator.

3 Claims, 5 Drawing Sheets

HEAT EXCHANGER EVAPORATOR

The present invention relates to a multi-pass evaporator of a heat exchanger for use, for example, in a motor vehicle air-conditioning system.

An example of refrigerant evaporator of the U-flow type of tube and fin construction is shown in EP-A-0138435.

Typically, such refrigerant evaporators utilise a number of U-shaped tubes which are interconnected at the ends thereof by two adjacent header tubes so as to form a bank of interconnected U-shaped tubes in which refrigerant fluid supplied to one of the header tubes can pass in parallel flow through the U-shaped tubes into the other header tube. Such a bank of U-shaped tubes is substantially rectangular in shape and typically has been housed in a substantially rectangular box-like housing within the motor vehicle air-conditioning system. These U-flow refrigerant evaporators display good refrigerant fluid pressure drop characteristics when in operation.

It is customary in such refrigerant evaporators to sub-divide the two adjacent header tubes into separate multi-pass manifolds which interconnect the ends of the U-shaped tubes so that the refrigerant fluid is caused to flow in several passes, each containing several U-shaped tubes, backwards and forwards across the evaporator from one header tube to the other header tube. In such refrigerant evaporators, it is customary to have an inlet for the refrigerant fluid entering one end of one of the header tubes and an outlet for the refrigerant fluid exiting from the other end of that header tube or the adjacent end of the adjacent header tube, depending on how many passes are provided in the evaporator. Thus, in the customary three-pass U-flow refrigerant evaporator, the inlet for the refrigerant fluid is one end of one of the header tubes and the outlet is at the other end of the other header tube.

Problems are now arising in the design of modern motor vehicles wherein the quantity of auxiliary equipment being provided in the motor vehicle is conflicting with the space available in the motor vehicle to house such equipment. Consequently, the volume of space available to house air conditioning systems in many modern motor vehicles is so confined that, in many instances, there is insufficient room for a rectangular-shaped refrigerant evaporator of the type which has a refrigerant fluid inlet positioned at one end of the evaporator and a refrigerant fluid outlet positioned at the other end of the evaporator.

An arrangement has been devised for the customary three-pass U-flow refrigerant evaporator in which both the refrigerant flow inlet and the refrigerant fluid outlet are positioned at the same end of the U-flow refrigerant evaporator. The inlet is positioned in one end of one header tube and the outlet is positioned in the adjacent end of the other header tube. In this arrangement, the inlet is formed by a tube which extends from said one end concentrically through said one header tube to a point approximately two-thirds of the way along that header tube, so that the refrigerant fluid enters that header tube at that point. The remaining third of said one header tube thus forms the first pass of the evaporator, with the refrigerant fluid flowing through the U-tubes of that first pass into the other header tube to return back along the other header tube to a middle section of the U-flow refrigerant evaporator which forms the second pass of the evaporator. In the second pass of the evaporator, the refrigerant fluid flows through the U-tubes of the second pass back into an annular space in said one header tube surrounding the inlet tube, which annular space leads to a third pass of the evaporator. The refrigerant fluid entering the third pass flows through the U-tubes of the third pass to return to the other header tube, and leaves the evaporator via the outlet in said adjacent end of the other header tube.

In this type of three-pass U-flow refrigerant evaporator, the ratio of the internal cross-sectional area of the inlet tube relative to the cross-sectional area of the annular space within said one header tube surrounding the inlet tube is arranged to be of the order of 1:10, since this provides a highly suitable heat transfer performance for the evaporator. However, since the inlet tube within said one header tube carries a mixture of liquid and vapour, any variations in pressure drop or expansion within the inlet tube will result in the production of noise, in particular, a hissing noise.

The present invention seeks to provide an improved heat exchanger evaporator.

According to an aspect of the present invention, there is provided a multi-pass evaporator of a heat exchanger comprising a plurality of heat exchanger tubes coupled to a first header tube and an exchanger fluid inlet tube disposed within and spaced from the first header tube, the inlet tube extending from an inlet end of the first header tube to a position intermediate the length of the first header tube, wherein the ratio of the axial cross-sectional area of the interior of the inlet tube to the axial cross-sectional area of the space between the first header tube and the inlet tube is in the range of 1:4.0 to 1:7.0.

It has been found that such a construction of evaporator can reduce significantly the amount of noise produced during operation of the evaporator.

Preferably, the axial cross-sectional area of the interior of the inlet tube is equal to or greater than 35 millimeters squared.

Advantageously, there is provided a second header tube disposed adjacent the first header tube and coupled to the heat exchanger tubes, the second header tube including an outlet adjacent the inlet end of the first header tube.

In axial cross-section, the first header tube preferably is substantially elliptical in shape and includes two substantially straight sides extending substantially parallel to the major axis of the ellipse.

The axis of the inlet tube may be disposed substantially on the major axis of the first header tube and adjacent one focus of the ellipse.

In a preferred embodiment, there is provided a three-pass U-flow refrigerant evaporator comprising a number of U-shaped tubes interconnected at the ends thereof by two adjacent header tubes so as to form a bank of the interconnected U-shaped tubes in which refrigerant fluid supplied to one of the header tubes can pass in parallel flow through the U-shaped tubes into the other header tube, each of said header tubes being sub-divided by a transverse blocking member to form two separate plenum chambers; an inlet for said refrigerant fluid being positioned in one end of said one header tube and an outlet for said refrigerant fluid being positioned in an adjacent end of said other header tube in fluid communication with a second of said two plenum chambers of said other header tube, said inlet being formed as a tubular member which extends inside said one header tube substantially parallel to the axis of said one header tube, for substantially the length of a first of said plenum chambers of said one header tube, passes through the transverse blocking member in said one header tube, and connects with a second of said plenum chambers of said one header tube, so that refrigerant fluid supplied to said inlet passes along said tubular member, into the second of said plenum chambers of said one header tube, through said U-shaped tubes interconnecting said second of said plenum chambers of said one header tube with a first plenum chamber of said other header tube, along said first plenum chamber of said other header tube in the direction of said transverse blocking member, through said U-shaped tubes interconnecting said first plenum chamber of said other header tube with said first plenum chamber of said one header tube into a space in said first plenum chamber surrounding said tubular member, along said space in said first plenum chamber of said one header tube in the direction of said one end, and through said U-shaped tubes interconnecting said first plenum chamber of said one header tube with said second plenum chamber of said other header tube into said second plenum chamber, to leave the evaporator by said outlet, the ratio of the cross-sectional internal area of the tubular member to the cross-sectional area of said surrounding space being maintained in the range of 1:4.0 to 1:7.0, with an internal area of the tubular member equal to or greater than 35 mm².

It has been discovered that, in three-pass U-flow refrigerant evaporators, for example, it is possible to minimise the volume of noise produced during the operation of the evaporator by ensuring that the ratio of the cross-sectional internal area of the tubular member to the cross-sectional area of the space within the header tube surrounding the tubular member is maintained in the range of 1:4.0 to 1:7.0, without prejudicing the heat transfer properties of the evaporator.

Preferably, each header tube of the three-pass evaporator of this embodiment has a cross-section in the shape of an ellipse that has been partially flattened so as to produce two opposed sides parallel to the major axis of the ellipse, and the tubular member forming the inlet extends through said one header tube with its axis intersecting the major axis of the ellipse adjacent one focus of the ellipse.

The U-flow refrigerant evaporator of this embodiment may be formed as an assembly of uniform U-flow flat tubes with air centres therebetween, the ends of which flat tubes are shaped into integral header tanks having opposed, aligned apertures therein, the evaporator being assembled as a stack of said flat tubes having the integral header tanks on the respective ends thereof in sealing contact with one another, with the opposed apertures therein aligned throughout the stack of flat tubes to form two adjacent header tubes, parallel to one another.

The present invention can provide an evaporator having a high heat transfer capacity without the creation of a high pressure drop across the evaporator. Moreover, in a preferred embodiment, the invention can provide a U-flow refrigerant evaporator of a motor vehicle air conditioning system which can be economically and easily manufactured from a number of standard U-flow evaporator plates, already manufactured in bulk for manufacturing standard U-flow evaporator cores for other air conditioning purposes.

An embodiment of the present invention is described below, by way of illustration only, with reference to the accompanying drawings, in which.

Figure 1:
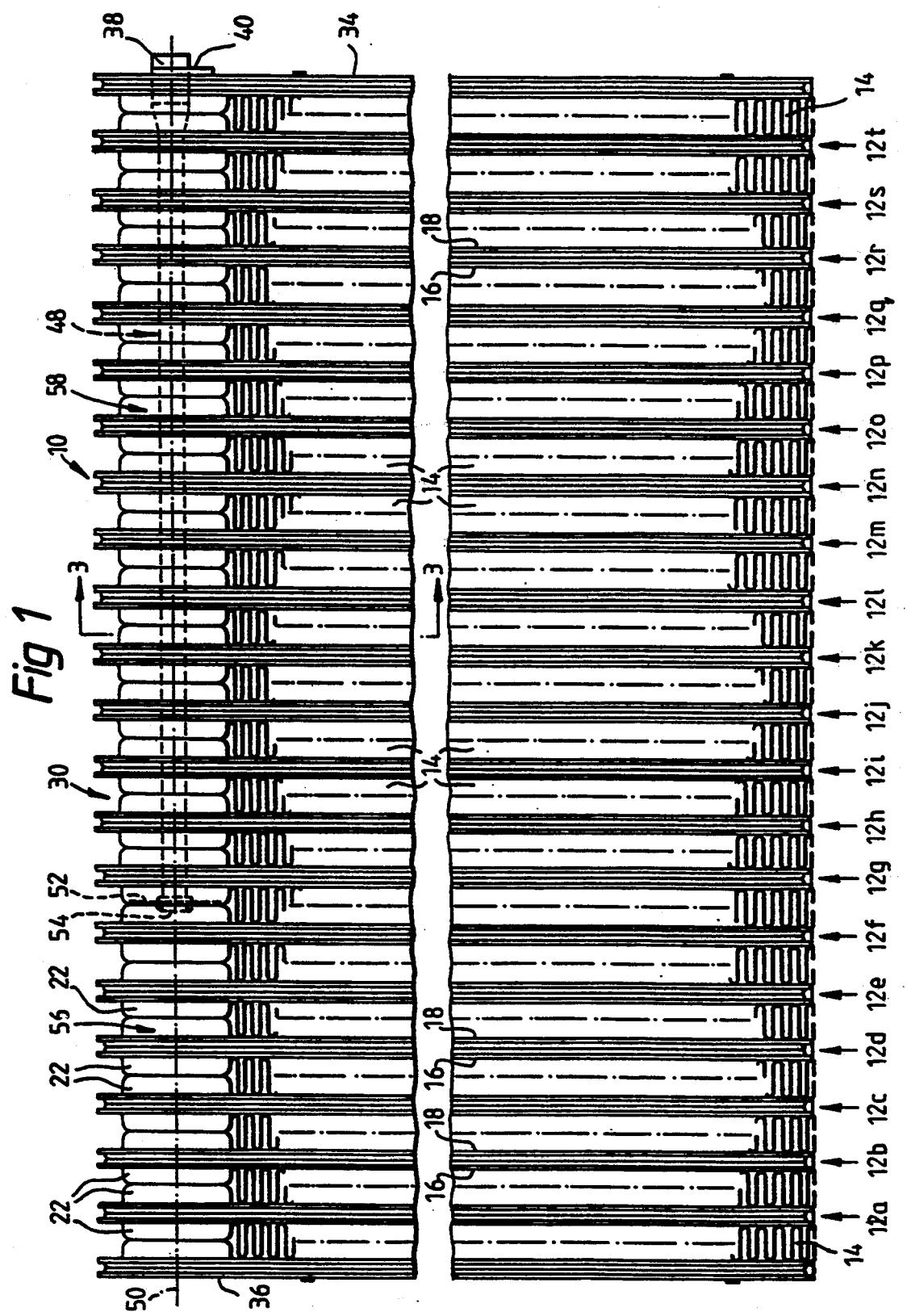
FIG. 1 is a front elevational view of an embodiment of three-pass U-flow refrigerant evaporator.

Referring to FIG. 1, the embodiment of three-pass U-flow refrigerant evaporator 10 shown comprises an assembly of uniform U-flow flat tubes 12a–12t with air centres 14 interposed therebetween.

Figure 2:
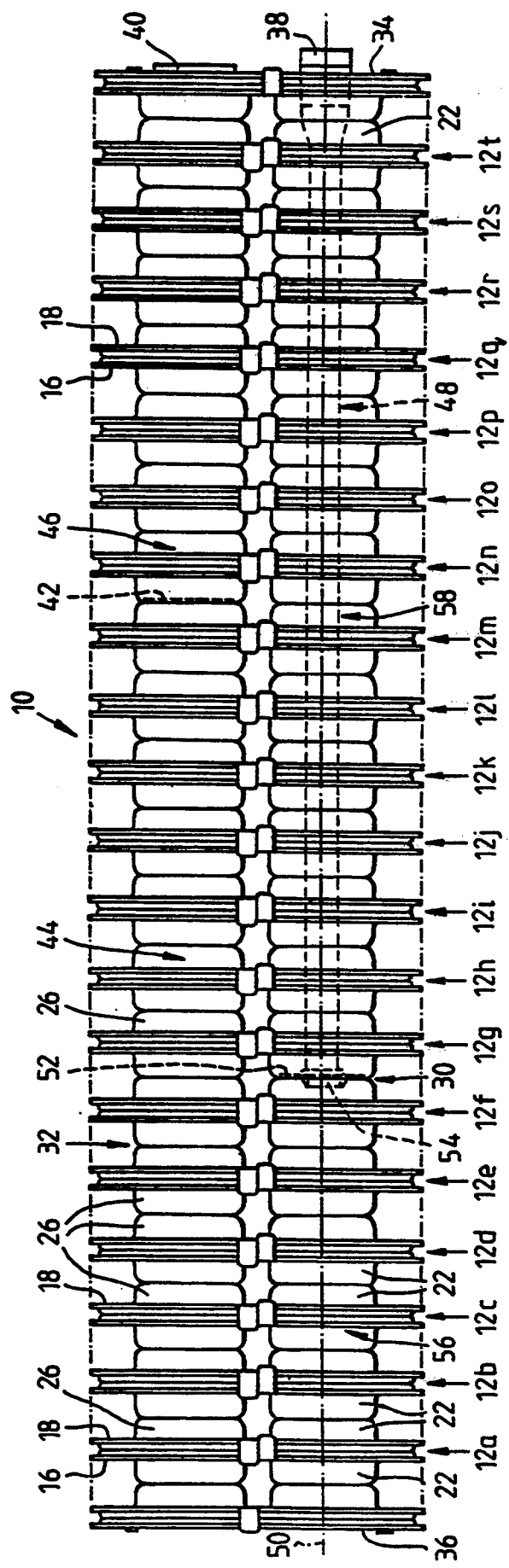
FIG. 2 is a plan view of the three-pass U-flow refrigerant evaporator shown in FIG. 1.

The construction of the U-flow evaporator 10 is shown in more detail in FIG. 2, from which it can be seen that each tube 12 is fabricated from a pair of mating core plates exemplified by inner core plate 16 and outer core plate 18. The core plates 16, 18 are made from stampings of thin aluminium sheet or other suitable heat-transfer material, and are generally rectangular in plan view with rounded corners. The upper ends of the plates 16, 18 are each formed with an inlet opening surrounded by a generally conical and truncated apertured protuberance 22, and an outlet opening surrounded by a generally conical and truncated apertured protuberance 26. The generally conical and truncated apertured protuberances 22, 26 are connected to one another, as shown in FIG. 2, to form a pair of integral header tubes 30, 32 for flow of refrigerant in either liquid phase or liquid/vapour phase through the flat tubes 12. The U-flow evaporator 10 shown in FIGS. 1 and 2 is made up of a total of twenty uniform identical tubes 12a to 12t brazed together, a first end plate 34, and a second end plate 36.

The first end plate 34 of the U-flow evaporator 10 has an inlet 38 into the integral header tube 30 at one end of the header tube 30, and an outlet 40 from the integral header tube 32 at an adjacent end of the header tube 32, as shown in FIG. 2. Moreover, there is a transverse blocking member 42 located in the integral header tube 32 between flat tubes 12m and 12n, which transverse blocking member 42 seals the adjacent outlet openings in flat tubes 12m and 12n so as to divide the integral header tube 32 into two separate plenum chambers 44, 46, the first plenum chamber 44 being made up of the respective apertured protuberances 26 of the thirteen flat tubes 12a to 12m, and the second plenum chamber 46 being made up of the respective apertured protuberances 26 of the nine flat tubes 12n to 12t, forming a third pass of the U-flow evaporator 10.

The inlet 38 is formed as a tubular member 48 which extends inside the integral header tube 30 substantially parallel to a longitudinal axis 50 of the integral header tube 30, passing through all of the inlet openings of the respective flat tubes 12g to 12t in the process. The tubular member 48 has a diameter less than the diameter of each of the inlet openings in the flat tubes 12g to 12t, so forming an opening in each of the respective inlet openings through which refrigerant fluid can flow from one flat tube to the next flat tube along the integral header tube 30. The tubular member 48 extends through a transverse blocking member 52 located in the integral header tube 30 between flat tubes 12f and 12g, so that refrigerant fluid supplied to said inlet 38 passes along said tubular member 48 and into the truncated apertured protuberances 22 of flat tube 12f. Transverse blocking member 52 seals around the open end 54 of the tubular member 48, and also seals the adjacent inlet openings in flat tubes 12f and 12g, so as to divide the integral header tube 30 into two separate plenum chambers 56, 58, the first plenum chamber 56 being made up of the respective apertured protuberances 22 of the six flat tubes 12a to 12f, forming a first pass of the U-flow evaporator 10, and the second plenum chamber 58 being made up of the respective apertured protuberances 22 of the fourteen flat tubes 12g to 12t. The tubular member 48 is sealingly secured to the transverse blocking member 52 by brazing, so as to prevent any bypass of refrigerant fluid leaving the open end 54 of the tubular member 48 into the inlet opening of flat tube 12g.

As can be appreciated from a study of FIG. 2, the first plenum chamber 44 of the integral header tube 32 overlaps the second plenum chamber 58 of the integral header tube 30, with the flat tubes 12g to 12m being common to both the first plenum chamber 44 and the second plenum chamber 58. Consequently, flat tubes 12g to 12m form a second pass of the U-flow evaporator 10.

Refrigerant fluid passing through the open end 54 of the tubular member 48 enters the first plenum chamber 56 of the integral header tube 30, and then passes through the U-shaped flat tubes 12a to 12f interconnecting the first plenum chamber 56 with the first plenum chamber 44 of the integral header tube 32 and into the outlet openings of the integral header tube 32, thus traversing the first pass of the U-flow evaporator 10. The flow of refrigerant in each U-shaped flat tube 12a to 12f occurs through a first flow passage formed in each tube 12a to 12f on one side of a raised divider rib formed on each of the core plates 16, 18 forming each tube 12a to 12f. The divider rib is located in the centre of each tube 12a to 12f to form the first flow passage and a second flow passage which communicates with the integral header tube 32.

The refrigerant fluid then passes along the integral header tube 32 in the direction of the transverse blocking member 42 through the outlet openings in the U-shaped flat tubes 12g to 12m, through the U-shaped flat tubes 12g to 12m interconnecting the first plenum chamber 44 with the integral header tube 30, and into the second plenum chamber 58 of the integral header tube 30, thus traversing the second pass of the U-flow evaporator 10.

In each f the U-shaped flat tubes 12g to 12m flow of refrigerant from the header tube 32 occurs through a first flow passage formed in each tube 12g to 12m on one side of a raised divider rib formed on each of the core plates 16, 18 forming each tube 12g to 12m. The divider rib is located in the centre of each tube 12g to 12m to form the first flow passage and a second flow passage which communicates with the second plenum chamber 58 of the integral header tube 30.

The refrigerant fluid from flat tubes 12g to 12m enters the space surrounding the tubular member 48 in the second plenum chamber 58 of the integral header tube 30, and passes along the second plenum chamber 58 of the integral header tube 30 in the direction of the end plate 34 to enter the space surrounding the tubular member 48 in the respective apertured protuberances 22 of the U-shaped flat tubes 12n to 12t. The refrigerant fluid then passes through the U-shaped flat tubes 12n to 12t interconnecting the second plenum chamber 46 of the integral header tube 32 with the integral header tube 30, and into the second plenum chamber 46 of the integral header tube 32, thus traversing the third pass of the U-flow evaporator 10. The refrigerant fluid finally leaves the U-flow evaporator 10 by the outlet 40 in the first end plate 34.

Figure 3:
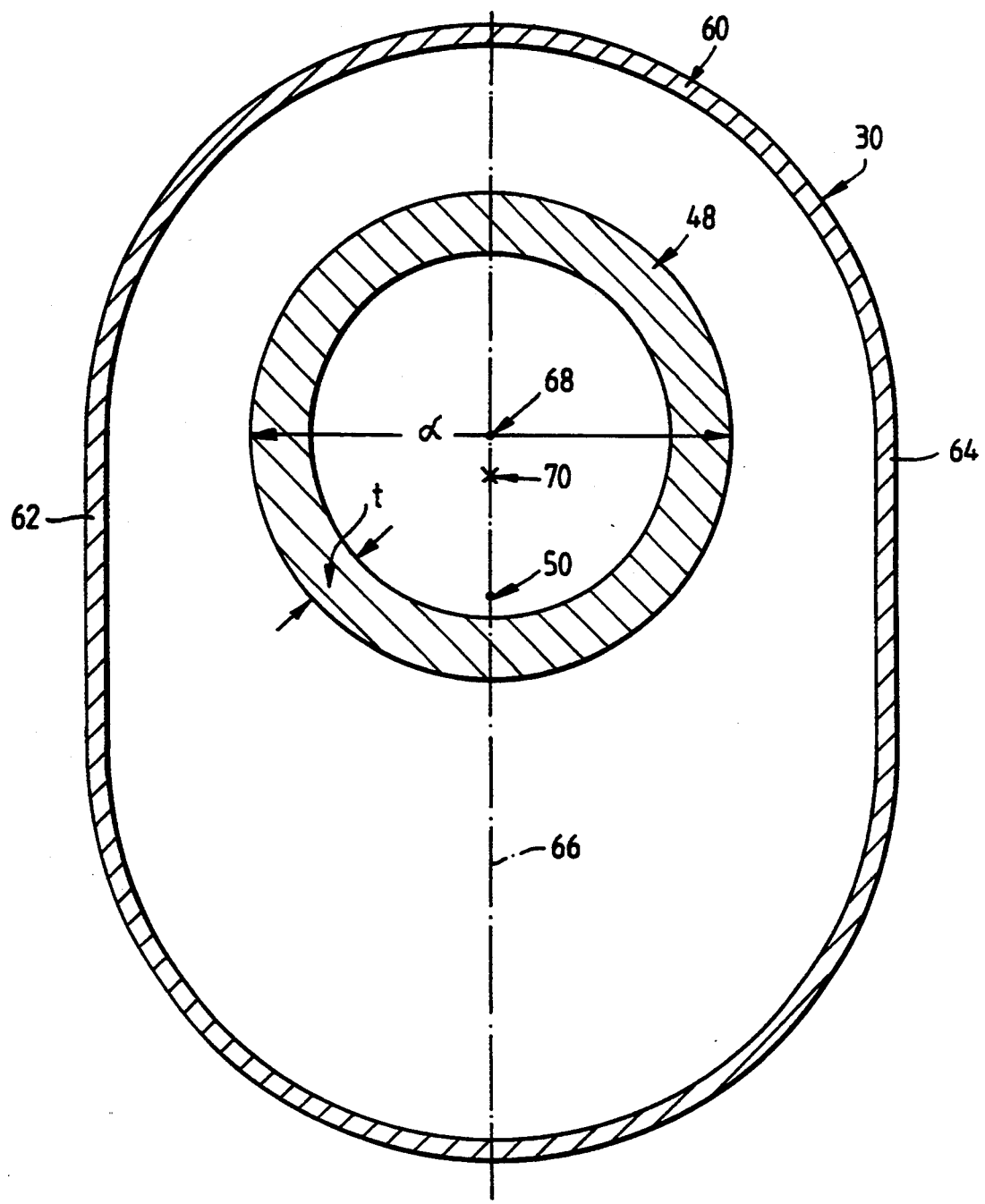
FIG. 3 is an enlarged cross-sectional view of a header tank of the three-pass U-flow refrigerant evaporator shown in FIG. 1, taken in the direction of arrows 3—3' in FIG. 1.

Referring to FIG. 3, each header tube 30 of the three-pass evaporator 10 has a cross-section in the shape of an ellipse 60 which has been partially flattened so as to produce two opposed sides 62, 64 which are parallel to the major axis 66 of the ellipse 60. The tubular member 48 forming the inlet extends through the integral header tube 30 with its axis 68 intersecting the major axis 66 of the ellipse 60 adjacent one focus 70 of the ellipse 60. Thus, as will be appreciated from a study of FIG. 3, the axis 68 of the tubular member 48 intersects the major axis 66 of the ellipse above the longitudinal axis 50 of the integral header tube 30, and the tubular member 48 is positioned off-centre in the integral header tube 30.

The ratio of the cross-sectional area of the tubular member 48 to the cross-sectional area of the space within the ellipse 60 surrounding the tubular member 48 is, in the preferred embodiment, in the range of 1:4.0 to 1:7.0 with a minimum internal area of 35 mm$^2$. It has been found that this range can minimise the volume of noise produced during operation of the evaporator without prejudicing its heat transfer properties.

Figure 4:
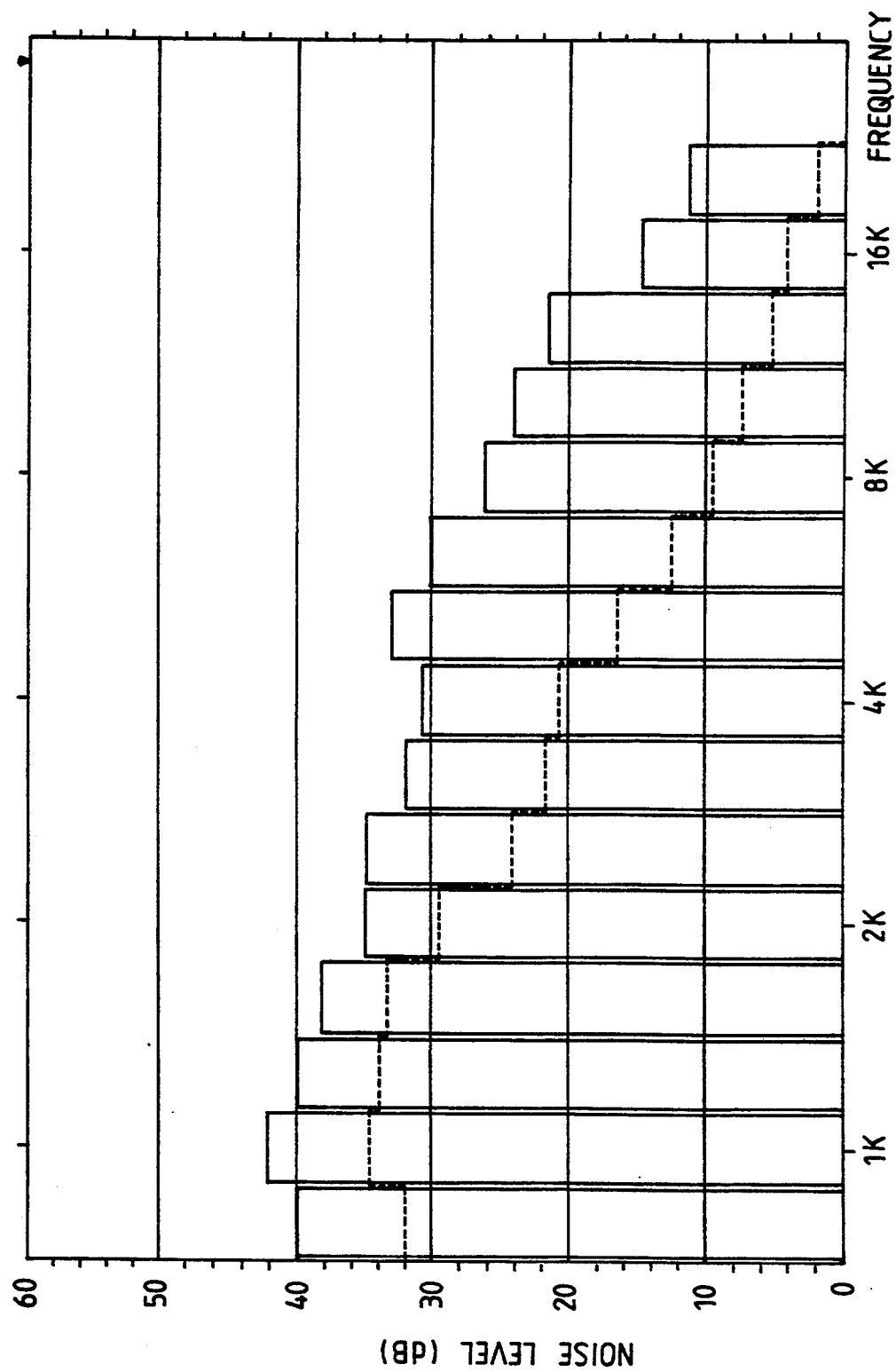
FIG. 4 is a bar chart of the noise emission from a three-pass evaporator in which the ratio of the internal cross-sectional area of an inlet tube to the cross-sectional area of a surrounding annular space within a header tube is of the order of 1:10.

FIG. 4 is a bar chart of the noise emission from a prior art three-pass evaporator, during the operation thereof in a motor vehicle air-conditioning system, in which the ratio of the internal cross-sectional area of an inlet tube relative to the cross-sectional area of an annular space within a header tube surrounding the inlet tube is of the order of 1:10. In this example, the inlet tube has a diameter of 6.35 mm ($\frac{1}{4}$ in) and an internal cross-sectional area equal to 14.87 mm$^2$. The cross-sectional area of the annular space is 150 mm$^2$.

The bar chart of FIG. 4 shows the noise output from the motor vehicle air-conditioning system in decibels over a range of frequencies extending over one third of an octave. The solid line of the bar chart represents the noise output at these frequencies when the evaporator is actually in operation, whereas the dotted line of the bar chart represents the noise output at these frequencies when the evaporator is not in operation and the motor vehicle air-conditioning system is being used solely for ventilation purposes (that is, only the fan in the system is operating). It can be seen that there is a marked increase in the noise output from the air-conditioning system over the whole range of frequencies when the evaporator is actually in operation.

Figure 5:
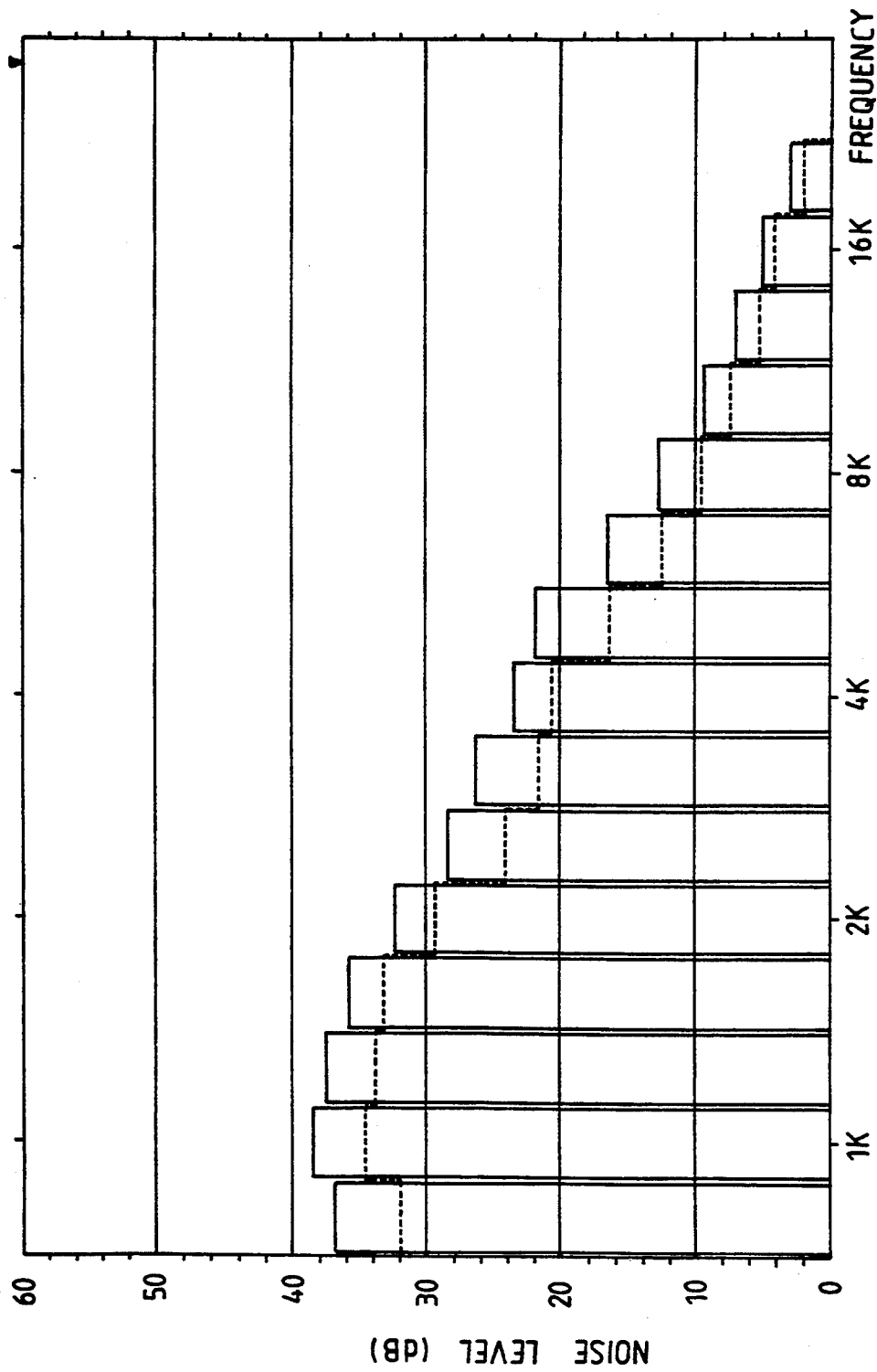
FIG. 5 is a bar chart of noise emission from an embodiment of three-pass evaporator.

FIG. 5 is a bar chart of the noise emission from a preferred embodiment of three-pass evaporator during operation thereof in a similar motor vehicle air-conditioning system. The three-pass U-flow refrigerant evaporator 10 used in this example has a tubular member 48 having a diameter d of 9.53 mm ($\frac{3}{8}$ in), a wall thickness t of 1.24 mm and an internal cross-sectional area equal to 39 mm$^2$. The cross-sectional area of the space within the ellipse 60 surrounding the tubular member 48 is 196 mm$^2$.

As can be seen from the bar chart of FIG. 5, when compared to the bar chart of FIG. 4, there is an overall decrease in the noise output from the motor vehicle air-conditioning system over the whole range of frequencies when the evaporator is actually in operation, and there is only a minor increase in the noise output from the motor vehicle air-conditioning system over the whole range of frequencies when the evaporator is switched on.

Thus, the above-described embodiment can provide an effective three-pass U-flow refrigerant evaporator in which the inlet and outlet to the evaporator are both situated at the same end of the evaporator, and in which noise, in particular hissing noise, from the evaporator is substantially reduced.

The disclosures in British patent application nos. 9307224.7 and 9323115.7, from which this application claims priority, and in the abstracts accompanying these applications are incorporated herein by reference.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A multi-pass evaporator of a heat exchanger comprising a plurality of pairs of joined, mating stamped core plates having inlet openings that form heat exchanger tubes and apertured protuberances forming a first header tube with an average cross sectional area into which said flow tubes open and an exchanger fluid inlet tube disposed within and spaced from the first header tube, the inlet tube extending from an inlet end of the first header tube to a position intermediate the length of the first header tube, wherein the ratio of the axial cross-sectional area of the interior of the inlet tube to the axial cross-sectional area of the space between the first header tube and the inlet tube is in the range of 1:4.0 to 1:7.0.

2. A multi-pass evaporator according to claim 1, wherein in the average axial cross-section the first header tube is substantially elliptical in shape and includes two substantially straight sides extending substantially parallel to the major axis of the ellipse.

3. A multi-pass evaporator according to claim 2, wherein the axis of the inlet tube is disposed substantially on the major axis of the first header tube and adjacent one focus (68) of the ellipse.

* * * * *